No. 651,715. Patented June 12, 1900.
B. JANELLE.
FILLING SUPPLYING MECHANISM FOR LOOMS.
(Application filed Sept. 30, 1899.)
(No Model.)
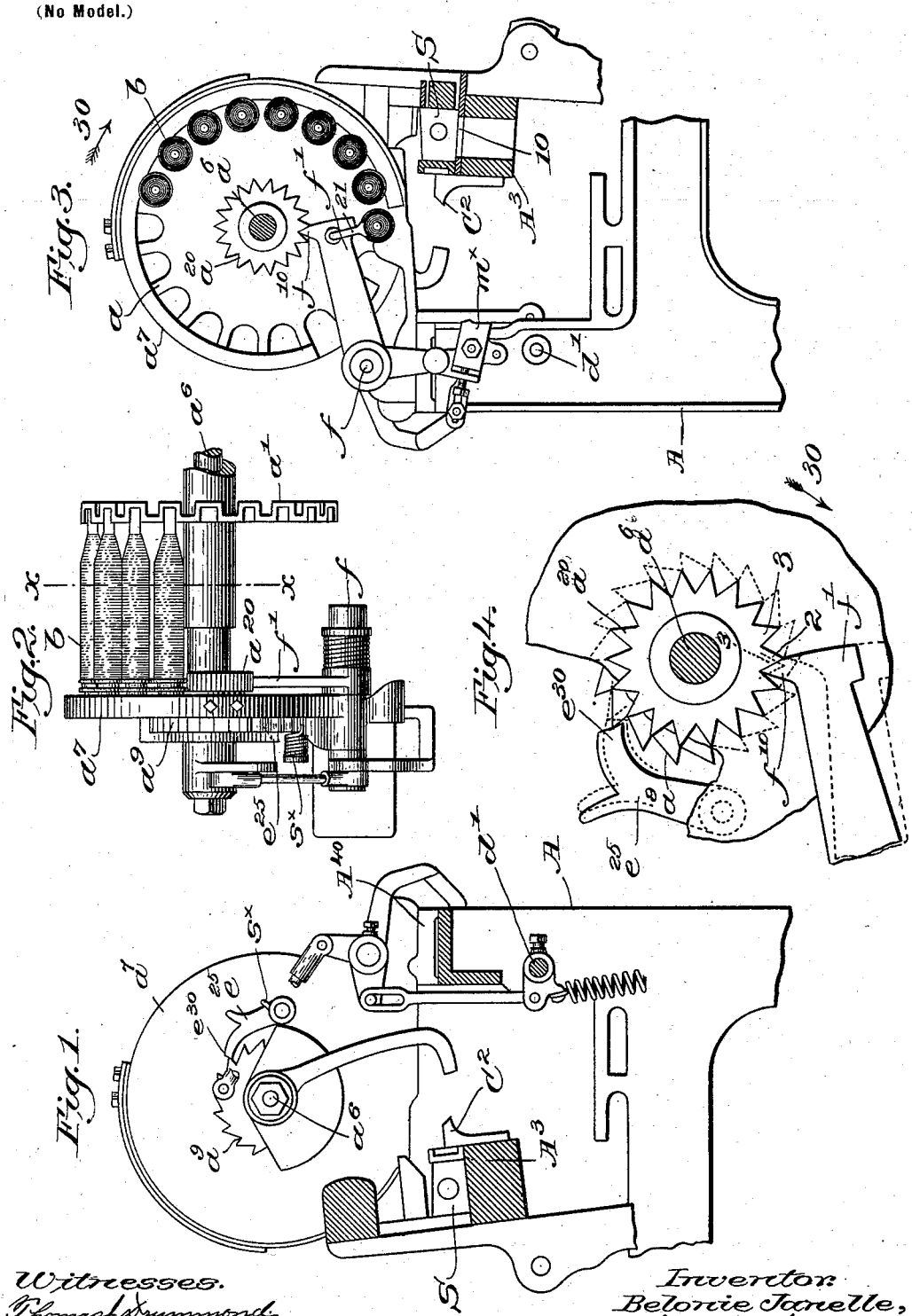

UNITED STATES PATENT OFFICE.

BELONIE JANELLE, OF MANCHESTER, NEW HAMPSHIRE, ASSIGNOR OF THREE-FOURTHS TO HERMAN F. STRAW AND HARRY E. PARKER, OF SAME PLACE.

FILLING-SUPPLYING MECHANISM FOR LOOMS.

SPECIFICATION forming part of Letters Patent No. 651,715, dated June 12, 1900.

Application filed September 30, 1899. Serial No. 732,141. (No model.)

*To all whom it may concern:*

Be it known that I, BELONIE JANELLE, of Manchester, county of Hillsborough, State of New Hampshire, have invented an Improvement in Filling-Supplying Mechanism for Looms, of which the following description, in connection with the accompanying drawings, is a specification, like letters and figures on the drawings representing like parts.

This invention relates to looms provided with automatic filling-supplying mechanism, and more particularly to that type wherein a movable feeder, adapted to hold a series of filling-carriers, is moved intermittently to bring the filling-carriers one by one into operative position to be transferred. Such a type of loom forms the subject-matter of United States Patent No. 529,940, dated November 27, 1894, the feeder being therein shown as circularly movable, and I have herein shown my invention as embodied in a filling-supplying mechanism of that character.

In the loom shown in the patent referred to the intermittent movement of the filling-feeder is effected by the partial unwinding of a strong spring, means being provided to automatically wind the spring after each transfer of a filling-carrier, and the transferrer forces a filling-carrier from the feeder against the stress of the spring. This subjects the filling-carriers to unnecessary strain, and as the feeder is positioned by the engagement of the filling-carrier next to be removed with a fixed stop the filling-carriers used must always be in good condition.

In my present invention I have greatly simplified the construction of the filling-supplying mechanism by reducing the number of operating parts, and I have obviated altogether the heavy spring referred to, as well as its winding mechanism, and I have furthermore provided means for moving the feeder positively to bring into position the filling-carrier next to be transferred. I have also so arranged the apparatus that at the time of transfer the feeder is unlocked and free to accommodate itself to the movement of the transferrer, thus obviating any binding or retarding action upon the filling-carrier save that necessarily due to the means for temporarily retaining it in place in the feeder. When the feeder is unlocked, the inertia thereof may be overcome by gravity to give it a slight initial movement, which movement is taken up and completed positively as the transferrer returns to normal position; but in order to absolutely insure the slight initial movement of the feeder I prefer to employ a simple device which will operate irrespective of gravity, so that if for any reason the latter should fail to act promptly the proper progressive movement of the feeder will still be effected. The filling-carriers themselves have nothing whatever to do with the stopping and final positioning of the feeder, so that they can be used even when considerably damaged.

Figure 1 is a transverse sectional view of a portion of a loom, taken inside the filling-supplying mechanism and illustrating one embodiment of my invention. Fig. 2 is a plan view of the filling-supplying mechanism. Fig. 3 is a transverse section on the line $x\,x$, Fig. 2, looking toward the left; and Fig. 4 is an enlarged detail on the line $x\,x$, Fig. 2, of a part of the mechanism, one of the disks or plates forming a part of the filling-feeder being broken out to more clearly show the mechanism.

The loom-frame A, the lay $A^3$, slotted below one of the shuttle-boxes, as at 10, Fig. 3, and the bunter $C^2$, the self-threading shuttle S, the filling-supplying mechanism, consisting, essentially, as herein shown, of a notched disk $a$ to receive the heads of the filling-carriers $b$ and a second disk $a'$ to hold their tips or small ends, the disks being connected and mounted to rotate in unison on the fixed stud $a^6$, secured to a stand $a^7$, and the transferrer $f'$, mounted on a stud $f$, may be and are substantially as in the patent referred to, the controlling mechanism being substantially the same as in the United States Patent No. 568,455, dated September 29, 1896. The dog $m^\times$ is governed as to its position by and through the rock-shaft $d'$ and the intervening connections. The disks $a\,a'$ of the feeder are mounted to rotate freely on the stud $a^6$, and a toothed disk or star-wheel $a^{20}$ is herein shown as rotatable with and located at the inner side of the disk $a$, the notches or spaces on the teeth of the disk corresponding in number to the radial holding devices for the filling-carriers, which are arranged circularly relatively to the axis of the feeder. The transferrer $f'$, having the finger 21 to engage the tip of the filling-carrier, projects between the disks, as in the patent hereinbefore referred to, and normally is in substantially the position shown in Fig. 3.

I have herein shown a dog $f^{10}$ to coöperate with the disk $a^{20}$ and move the feeder positively and intermittently to bring the filling-carriers one by one into position to be engaged and removed by the transferrer, such positioning of the feeder being controlled by or through the transferrer.

In the very simple construction herein shown the dog $f^{10}$ is secured to or forms a part of the transferrer $f'$, projecting upwardly therefrom to engage the disk $a^{20}$ when the transferrer is retracted, as in Fig. 3, and full lines, Fig. 4. It will be manifest from an inspection of these figures that at such times the feeder is locked from movement, so that the filling-carrier next to be transferred is maintained in position in the path of the transferrer. When the transferrer moves outward to engage the filling-carrier in its path, the dog $f^{10}$ will be withdrawn from the notched disk, and the slight movement of the feeder when thus released or unlocked will be sufficient to carry the point of the released tooth of the disk past the point of the dog into dotted-line position, Fig. 4, the feeder moving in the direction of the arrow 30, Figs. 3 and 4, so that when the transferrer returns to normal position the dog will travel along the adjacent inclined face of the said tooth and will positively rotate the feeder to bring the next filling-carrier into operative position—that is to say, if the dog is withdrawn from engagement with the left-hand side of the tooth 2, Fig. 4, and the feeder is moved in the direction of the arrow 30 sufficiently to bring the dog into engagement with the right-hand side of said tooth 2 on its return to normal position it will be manifest that when the feeder is brought to rest the tooth 3 will occupy the position in which the tooth 2 is shown. As each transfer is effected the feeder is moved forward or progresses one step, and between successive transfers the feeder is locked from movement.

Inasmuch as the location of the transferrer between the disks of the feeder prohibits filling the feeder completely, it is manifest that the resultant weight of the load of filling-carriers will be at one side of the center of gravity of the feeder and opposite the transferrer, so that gravity will operate to overcome the inertia of the feeder and effect the slight initial movement thereof hereinbefore referred to, to be positively continued and completed by or through the coöperation of the notched disk $a^{20}$ and dog $f^{10}$; but I find it preferable for some reasons to employ a starting device which will operate independently of gravity to overcome the inertia of the feeder when it is unlocked, and for this purpose I may conveniently use the ratchet $a^9$ and the coöperating-pawl $e^{25}$, depressed by a suitable spring, as $s^\times$, (see Figs. 1 and 2,) the face of the pawl being preferably slightly notched, as at $e^{30}$, Fig. 4, to engage the teeth of the ratchet. The spring $s^\times$, which is not a heavy spring at all, normally tends to move the pawl toward the axis of the feeder, the ratchet $a^9$ being concentric to said axis and rotatable with the feeder. So long as the feeder is locked from movement, as has been described, the pawl will be held in position shown by full lines, Fig. 4, and also Fig. 1; but when the dog $f^{10}$ is withdrawn from the disk $a^{20}$ the spring $s^\times$ will depress the pawl, and its notched part $e^{30}$, acting against the tooth of the ratchet, will tend to rotate the latter and the feeder in the direction of the arrow 30, the strength of the spring being sufficient to overcome the inertia of the feeder and to effect the very slight necessary initial movement of the disk $a^{20}$, as hereinbefore set forth. When the transferrer returns to normal position after effecting the transfer of the filling-carrier, the positive movement imparted to the feeder by the dog $f^{10}$ turns the ratchet $a^9$ sufficiently to bring the pawl $e^{25}$ into position on the next tooth of the ratchet corresponding to the position shown in Fig. 4, so that the parts are in position for the next transfer.

It will be noted that during transfer the feeder is free to move, so that the filling-carrier in operative position can adjust itself, if necessary, to the transferrer.

The stoppage of the feeder and the locking of the same are entirely independent of the filling-carriers, so that the latter need not be in perfect condition in order to be available.

The ratchet and pawl in the patents herein referred to prevent retrograde movement of the filling-feeder, and obviously this same function is present in the construction herein shown.

By comparing the construction herein shown with Patent No. 529,940, herein referred to, it will be seen that my invention is readily applicable to the Northrop type of filling-supplying mechanism, the latter being thereby greatly simplified and its operation being improved in the particulars hereinbefore noted.

I have herein illustrated and described one embodiment of my invention without attempting to show the various modifications thereof which might be made, and accordingly my invention is not restricted to the precise arrangements herein described.

In the mechanism herein shown gravity may act to move the feeder; but a gravity-actuated feeder of this type is shown and claimed in another application, Serial No. 732,142, filed concurrently by me.

My present invention comprehends novel mechanical means for imparting positive movement to the feeder whether or not there be any gravity action in addition thereto.

Having described my invention, what I claim as new, and desire to secure by Letters Patent, is—

1. A movable filling-feeder to hold a series of filling-carriers, a transferrer, and means controlled by the transferrer to move the feeder positively and intermittingly and place the filling-carriers one by one in the path of the transferrer.

2. A rotatable filling-feeder to hold a circularly-arranged series of filling-carriers, a transferrer, and means controlled by the transferrer to move the feeder positively and intermittingly to place the filling-carriers one by one in the path of the transferrer said means also locking the feeder from movement between successive operations of the transferrer.

3. A rotatable filling-carrier to hold a circularly-arranged series of filling-carriers, a transferrer, and means, including a member movable with the transferrer, to move the feeder positively and intermittingly and place the filling-carriers one by one in position to be transferred.

4. A rotatable filling-feeder to hold a circularly-arranged series of filling-carriers, a transferrer, means to move the feeder positively and intermittingly and place the filling-carriers one by one in position to be transferred, and to lock the feeder between such movements, and a starting device to overcome the inertia of the feeder when it is unlocked.

5. A rotatable filling-feeder to hold a circularly-arranged series of filling-carriers, a transferrer, a dog mounted thereon, a toothed wheel rotatable with the feeder and engaged by the dog when the transferrer is inoperative, and means to overcome the inertia of the feeder when unlocked by operation of the transferrer, return of the latter to normal position acting, through the dog and toothed wheel, to positively move the feeder to bring into operative position the next filling-carrier to be transferred.

6. A rotatable filling-feeder, means independent of the filling-carriers held thereby to normally lock it from movement, and a transferrer to remove the filling-carriers one by one from the feeder, operative movement of the transferrer releasing the feeder from the locking means.

7. A movable filling-feeder adapted to hold a series of filling-carriers, a transferrer to remove the latter one by one, and means operative on the return movement of the transferrer to positively position the feeder with the filling-carrier next to be removed in the path of the transferrer.

8. A rotatable filling-feeder adapted to hold a series of filling-carriers, a ratchet and a toothed disk rotatable with the feeder, a transferrer, a dog thereupon to engage the toothed disk when the transferrer is retracted, and a spring-actuated pawl to coöperate with the ratchet, said pawl imparting initial rotation to the feeder when operation of the transferrer withdraws the dog from the toothed disk, the subsequent engagement of said dog and the next tooth of the disk completing the movement of the feeder and locking it with the filling-carrier next to be transferred in the path of the transferrer.

9. A rotatable filling-feeder adapted to hold a series of filling-carriers, a disk notched to correspond to the position of the filling-carriers, a transferrer, a dog thereupon to enter a notch of the disk when the transferrer is retracted, and independent means to impart initial movement to the feeder when the dog is withdrawn, return of the transferrer after removal of a filling-carrier causing the dog to engage and advance the disk and feeder one step to bring the filling-carrier next to be transferred into the path of the transferrer.

10. A movable filling-feeder to hold a series of filling-carriers, a transferrer to engage and remove the latter one by one, means controlled by the transferrer to normally prevent movement of the feeder, and independent means to overcome the inertia of the feeder when free to move.

11. A step-by-step rotatable holder adapted to contain a plurality of filling-supplies, a transferrer to remove the filling-supplies one after another, and means controlled by movement of the transferrer to effect the rotation of the holder.

12. A rotatable holder to support a series of filling-supplies, a transferrer, and means including a member movable with the transferrer to effect a step-by-step rotation of the holder and thereby present the filling-supplies one after another to the action of the transferrer.

13. A rotatable filling-supply holder, a transferrer to remove the filling-supplies singly from the holder, means controlled by the transferrer to effect step-by-step movement of the holder, and a device to prevent retrograde movement of the latter.

14. A movable filling-supply holder, means to move the same, and a transferrer arranged also to control the movement of the holder.

15. A step-by-step movable holder adapted to support a plurality of filling-supplies, means to move the holder, and a transferrer arranged also to control the movement of the holder to bring the filling-supplies singly into operative position relative to the transferrer.

In testimony whereof I have signed my name to this specification in the presence of two subscribing witnesses.

BELONIE JANELLE.

Witnesses:
JAMES EDMOND,
T. J. HOWARD.